C. R. FRANKS.
VALVE FOR GAS BURNERS.
APPLICATION FILED APR. 6, 1910.
981,630.
Patented Jan. 17, 1911.
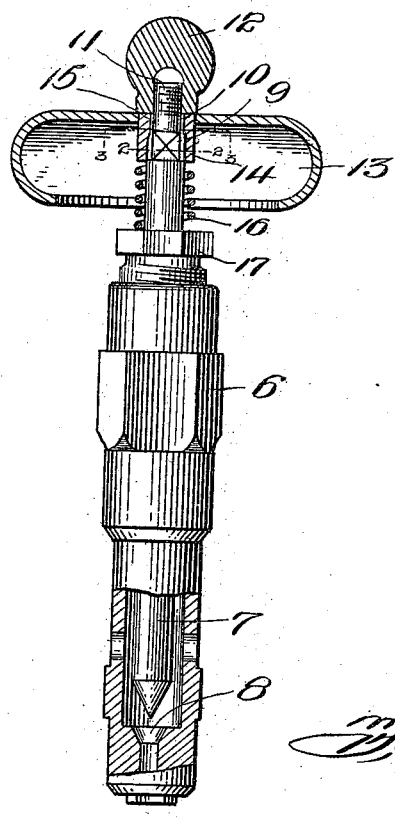
Fig. 1.
Fig. 2.
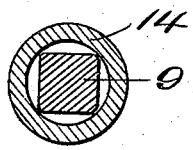
Fig. 3.
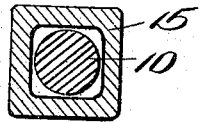
Witnesses
Inventor
C. R. Franks.
by Bomhardt & Co
Attorneys

UNITED STATES PATENT OFFICE.

CLYDE R. FRANKS, OF CHICAGO, ILLINOIS.

VALVE FOR GAS-BURNERS.

981,630.

Specification of Letters Patent.   Patented Jan. 17, 1911.

Application filed April 6, 1910.   Serial No. 553,701.

*To all whom it may concern:*

Be it known that I, CLYDE R. FRANKS, a citizen of the United States, residing at Chicago, in the county of Cook and State of Illinois, have invented certain new and useful Improvements in Valves for Gas-Burners, of which the following is a specification.

This invention relates to valves for gas burners, and is particularly adapted for use in connection with a gas stove or the like, although capable of other uses to which it may be applicable.

The object of the invention is to provide a safety valve which cannot be accidentally turned off or on, and when used in connection with gas stoves or the like will avoid any danger and trouble incident to small children turning on the gas, or any accidental turning on or off of the gas by contact of clothing or other objects with the handle of the valve. These objects are effected by making the handle of the valve loose on a circular part of the valve stem, but capable of being pushed forward against the tension of a spring to a non-circular part of the valve stem, to engage the same and operate the valve.

The invention is illustrated in the accompanying drawings in which—

Figure 1 is a sectional view of the valve. Fig. 2 is a section on the line 2—2 of Fig. 1. Fig. 3 is a section on the line 3—3 of Fig. 1.

Referring specifically to the drawings, 6 indicates a valve bushing or casing such as commonly used on a gas stove, and this is provided with a needle valve 7 which screws in or out to close or open the valve orifice at 8. These parts may be of ordinary construction. At the outer end the valve stem has a squared or other non-circular part 9, and beyond that a round neck or part 10, terminating in a threaded end 11 which receives the retaining nut 12. The hand wheel or handle which operates the stem is indicated at 13, and it has an inwardly projecting sleeve 14 which fits over the valve stem. The outer end of this sleeve is squared, as indicated at 15, to fit upon the squared part 9 of the valve stem when the hand wheel is pushed in. A spring 16 is coiled around the valve stem in compression between the inner end of the sleeve 14 and the nut 17 which screws into the outer end of the valve casing. Normally, the spring 16 forces the hand wheel outwardly to contact with the retaining nut 12, and in this position the squared part 15 at the center of the wheel extends around the neck 10 and is disengaged from the squared part 9 of the valve stem. In this position the hand wheel may be turned without operating the stem, since it simply rides around on the valve stem. To operate the valve, it is necessary to press in the hand wheel, against the tension of the spring 16, until the squared part 15 engages over the squared part 9, thereby locking the hand wheel and stem together so that when the wheel is turned the stem is also turned. When the pressure on the wheel is released the spring forces the same out to normally inoperative position.

It will be seen that unintentional movement of the hand wheel will not operate the valve, since the hand wheel must first be pushed in before it will engage the stem, and the spring 16 can be made stiff enough to prevent compression thereof by a small child, or any turn of the valve except by special effort. It will be observed that there is nothing to prevent the valve stem being screwed in to the extent necessary to close it, since the handle is free to follow its longitudinal movement, by compression of the spring 16.

What I claim as new is:—

The combination of a valve casing, a longitudinally movable needle valve which screws therein, a hand wheel loosely mounted on the end of the valve stem and rotatable relatively thereto and having a non-circular opening through which the stem extends, said stem having an inner non-circular part with which the said hand wheel is engageable when pushed forward on the stem, and a spring coiled around the stem between the casing and the wheel and acting to normally hold the wheel in disengagement with said non-circular part.

In testimony whereof I affix my signature, in presence of two witnesses.

CLYDE R. FRANKS.

Witnesses:
 NELLIE FELTSKOG,
 HARRY G. BATCHELOR, Jr.